(12) United States Patent
Wong et al.

(10) Patent No.: US 11,394,496 B2
(45) Date of Patent: Jul. 19, 2022

(54) COMMUNICATIONS DEVICE, INFRASTRUCTURE EQUIPMENT AND METHODS

(71) Applicant: Sony Corporation, Tokyo (JP)

(72) Inventors: Shin Horng Wong, Basingstoke (GB); Martin Warwick Beale, Basingstoke (GB); Kazuyuki Shimezawa, Basingstoke (GB); Vivek Sharma, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 75 days.

(21) Appl. No.: 16/960,890

(22) PCT Filed: Jan. 15, 2019

(86) PCT No.: PCT/EP2019/050962
§ 371 (c)(1),
(2) Date: Jul. 9, 2020

(87) PCT Pub. No.: WO2019/141685
PCT Pub. Date: Jul. 25, 2019

(65) Prior Publication Data
US 2020/0336255 A1    Oct. 22, 2020

(30) Foreign Application Priority Data
Jan. 19, 2018   (EP) .................................... 18152655

(51) Int. Cl.
*H04W 72/04*    (2009.01)
*H04L 1/18*    (2006.01)
(Continued)

(52) U.S. Cl.
CPC .......... *H04L 1/1819* (2013.01); *H04L 5/0055* (2013.01); *H04W 24/08* (2013.01);
(Continued)

(58) Field of Classification Search
CPC ... H04L 1/1819; H04L 5/0055; H04L 1/1822; H04L 1/1854; H04L 1/1861;
(Continued)

(56) References Cited

U.S. PATENT DOCUMENTS

2011/0310833 A1* 12/2011 Lee .................. H04W 52/0209
370/329
2015/0195850 A1* 7/2015 Quan .................... H04W 72/04
370/329

(Continued)

OTHER PUBLICATIONS

International Search Report and Written Opinion dated Mar. 29, 2019 for PCT/EP2019/050962 filed on Jan. 15, 2019, 9 pages.
(Continued)

*Primary Examiner* — Lan-Huong Truong
(74) *Attorney, Agent, or Firm* — Xsensus, LLP

(57) ABSTRACT

A communications device configured to receive data from an infrastructure equipment of a wireless communications network is provided. The communications device comprises transceiver circuitry configured to transmit signals and to receive signals via a wireless access interface provided by the wireless communications network, and controller circuitry. The controller circuitry is configured to control the transceiver circuitry to receive an explicit uplink hybrid automatic repeat request acknowledgement indicator, e-HARQ indicator, from the infrastructure equipment, and to determine, in accordance with the received e-HARQ indicator, whether or not the communications device should monitor for a first HARQ acknowledgement, HARQ-ACK, in a specific time slot and in a specific frequency resource of the wireless access interface, the first HARQ-ACK being transmitted by the infrastructure equipment in response to an uplink transmission from the communications device to the infrastructure equipment.

19 Claims, 8 Drawing Sheets

(51) Int. Cl.
  *H04W 76/27* (2018.01)
  *H04L 5/00* (2006.01)
  *H04W 24/08* (2009.01)
  *H04W 72/12* (2009.01)
  *H04W 72/14* (2009.01)
(52) U.S. Cl.
  CPC ..... *H04W 72/042* (2013.01); *H04W 72/0446* (2013.01); *H04W 72/0453* (2013.01); *H04W 72/1268* (2013.01); *H04W 72/14* (2013.01); *H04W 76/27* (2018.02)
(58) Field of Classification Search
  CPC .... H04L 1/1864; H04L 1/1812; H04W 24/08; H04W 72/042; H04W 72/0446; H04W 72/0453; H04W 72/1268; H04W 72/14; H04W 76/27
  See application file for complete search history.

(56) References Cited

U.S. PATENT DOCUMENTS

| | | | |
|---|---|---|---|
| 2018/0092089 A1* | 3/2018 | Yin | H04W 72/1278 |
| 2018/0123744 A1* | 5/2018 | Nogami | H04L 5/0053 |
| 2018/0167931 A1* | 6/2018 | Papasakellariou | H04L 5/0094 |
| 2020/0374933 A1* | 11/2020 | Lou | H04W 72/02 |

OTHER PUBLICATIONS

3GPP, "3rd Generation Partnership Project; Technical Specification Group Radio Access Network; Study on Scenarios and Requirements for Next Generation Access Technologies," Release 14, 3GPP TR 38.913 V14.3.0, Jun. 2017, pp. 1-39.

CATT, "NR Time Interval and System Design for Forward Compatibility," 3GPP TSG RAN WG1 No. 86, R1-166465, Gothenburg, Sweden, Aug. 22-26, 2016, pp. 1-5.

Holma, et al., "System Architecture Based on 3GPP SAE," LTE for UMTS OFDMA and SC-FDMA based radio access, John Wiley & Sons, Ltd., 2009, pp. 25-27.

NEC Group, "Downlink ACK/NACK signalling for E-UTRA," TSG-RAN WG1 No. 50, R1-073459, Athens, Greece, Aug. 20-24, 2007, pp. 1-6.

NTT Docomo, Inc., "Revised WID on New Radio Access Technology," 3GPP TSG RAN Meeting No. 78, RP-172834 (revision of RP-172115), Lisbon, Portugal, Dec. 18-21, 2017, 11 pages.

* cited by examiner

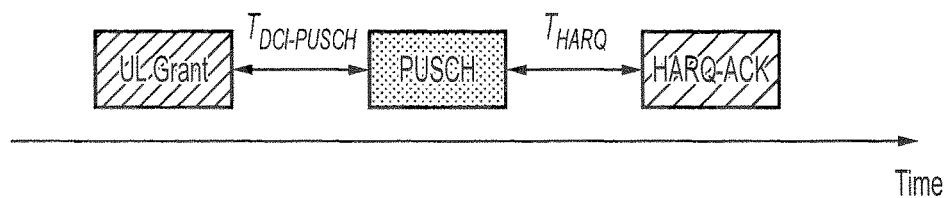
FIG. 9
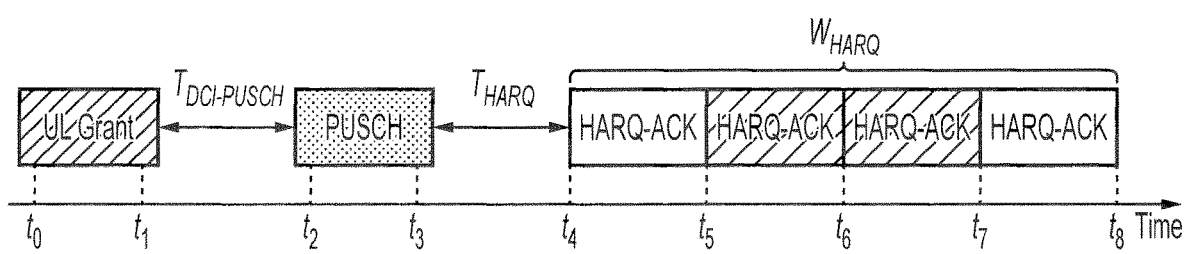
FIG. 10
FIG. 11

COMMUNICATIONS DEVICE, INFRASTRUCTURE EQUIPMENT AND METHODS

CROSS-REFERENCE TO RELATED APPLICATIONS

The present application is based on PCT filing PCT/EP2019/050962, filed Jan. 15, 2019, which claims priority to EP 18152655.9, filed Jan. 19, 2018, the entire contents of each are incorporated herein by reference.

BACKGROUND

Field of Disclosure

The present disclosure relates to communications devices configured to transmit data to a wireless communications network and to receive data from the wireless communications network via a wireless access interface using a transmitter and a receiver respectively, which include an arrangement for providing a feedback message such as an ACK or NACK which may be part of an automatic repeat request (ARQ) type protocol. The present invention also relates to methods of communicating using communications devices, wireless communications networks, infrastructure equipment and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

Another example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of terminal devices associated with different traffic profiles gives rise to new challenges for efficiently handling communications in wireless telecommunications systems that need to be addressed.

SUMMARY OF THE DISCLOSURE

The present disclosure can help address or mitigate at least some of the issues discussed above.

Embodiments of the present technique can provide a communications device configured to receive data from an infrastructure equipment of a wireless communications network. The communications device comprises transceiver circuitry configured to transmit signals and to receive signals via a wireless access interface provided by the wireless communications network, and controller circuitry. The controller circuitry is configured to control the transceiver circuitry to receive an explicit uplink hybrid automatic repeat request acknowledgement indicator, e-HARQ indicator, from the infrastructure equipment, and to determine, in accordance with the received e-HARQ indicator, whether or not the communications device should monitor for a first HARQ acknowledgement, HARQ-ACK, in a specific time slot and in a specific frequency resource of the wireless access interface, the first HARQ-ACK being transmitted by the infrastructure equipment in response to an uplink transmission from the communications device to the infrastructure equipment.

Embodiments of the present technique, which further relate to infrastructure equipment, methods of operating communications devices and infrastructure equipment and circuitry for communications devices and infrastructure equipment, allow for wireless communications networks to transmit an explicit uplink HARQ-ACK indicator to communications devices, where the explicit uplink HARQ-ACK indicator is used to tell the communications devices whether an explicit uplink HARQ-ACK should be expected.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 9 illustrates an example of an explicit HARQ (e-HARQ) indicator dependent on PUSCH HARQ process IDs in accordance with embodiments of the present technique;

FIG. 10 illustrates an example of time delays in a PUSCH transmission in accordance with embodiments of the present technique; and FIG. 11 illustrates an example of a time window comprising a plurality of consecutive time slots used for conveying an explicit HARQ-ACK in accordance with embodiments of the present technique.

DETAILED DESCRIPTION OF THE EMBODIMENTS

Long Term Evolution Advanced Radio Access Technology (4G)

Figure 1A:
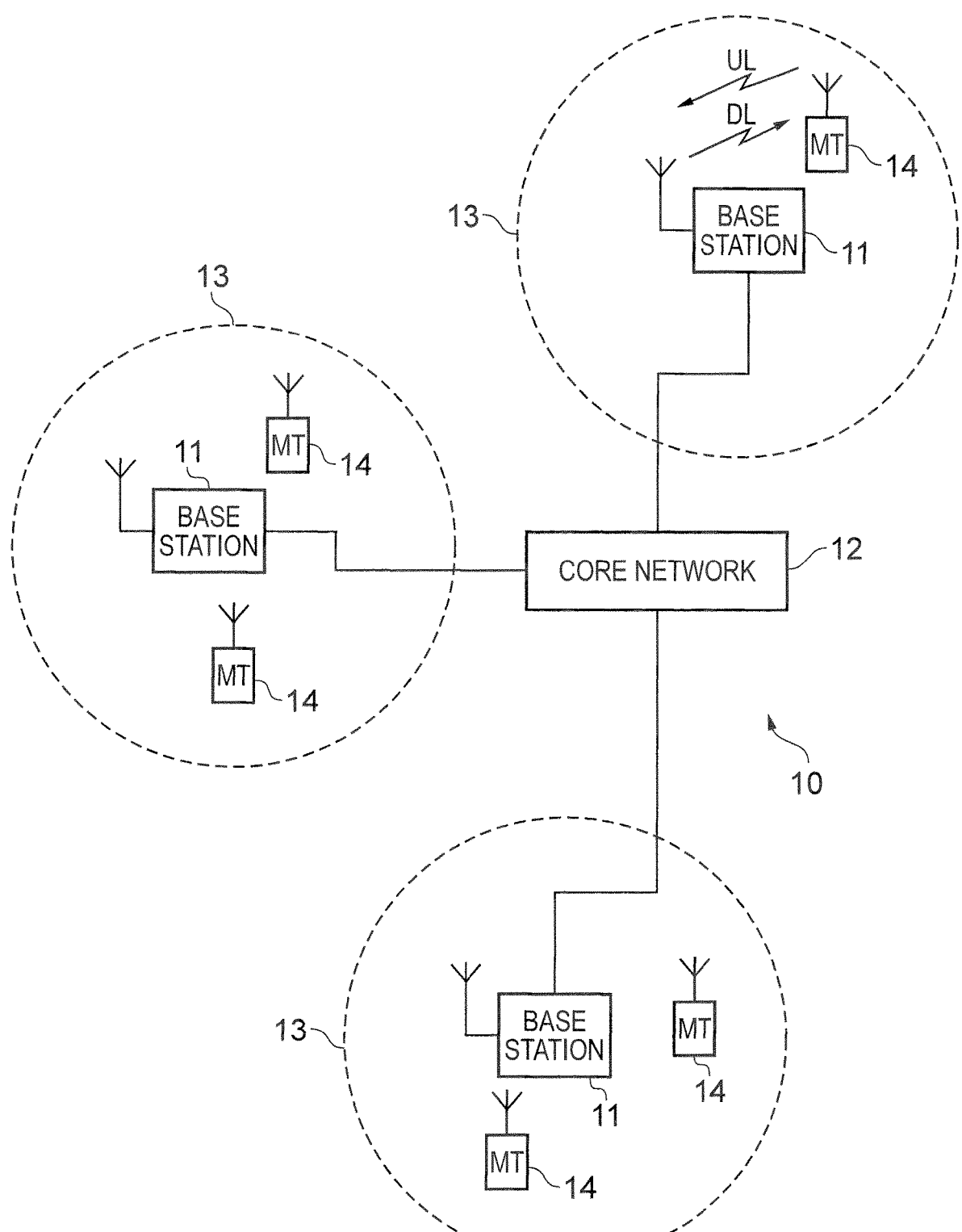
FIG. 1a schematically represents some aspects of an LTE-type wireless telecommunication system which may be configured to operate in accordance with certain embodiments of the present disclosure.

FIG. 1a provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1a and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can also find application with advanced wireless communications systems such as those referred to as 5G or New Radio (NR) Access Technology. The use cases that are considered for NR include:

Enhanced Mobile Broadband (eMBB)
Massive Machine Type Communications (mMTC)
Ultra Reliable & Low Latency Communications (URLLC) [2]

eMBB services are characterised by high capacity with a requirement to support up to 20 Gb/s. The requirement for URLLC is a reliability of $1-10^{-5}$ (99.999%) for one transmission of a 32 byte packet with a user plane latency of 1 ms [3].

The elements of the wireless access network shown in FIG. 1a may be equally applied to a 5G new RAT configuration, except that a change in terminology may be applied as mentioned above.

Figure 1B:
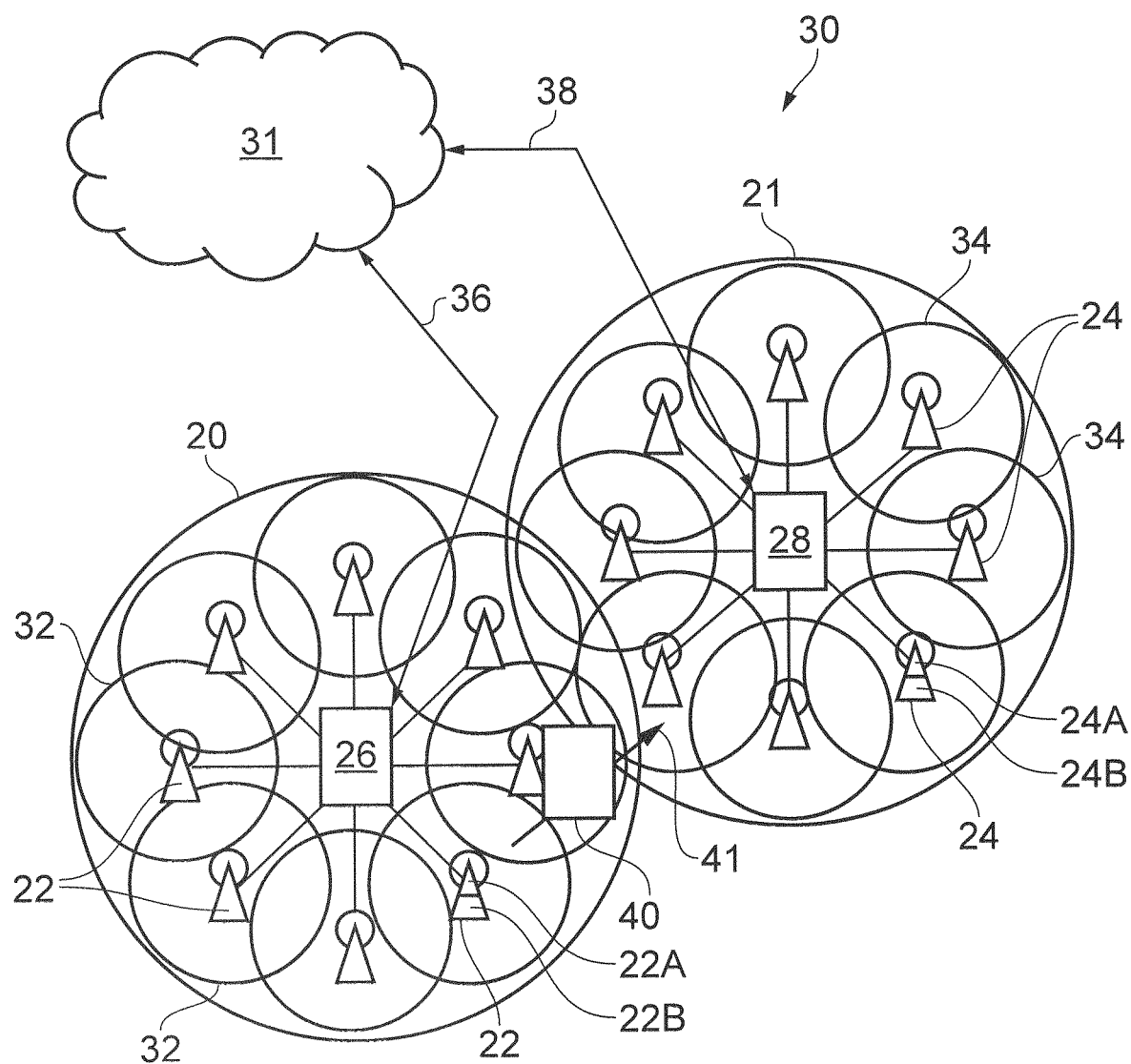
FIG. 1b schematically represents some aspects of a new radio access technology (RAT) wireless telecommunications system which may be configured to operate in accordance with certain embodiments of the present disclosure.

FIG. 1b is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 1b comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 1b may be broadly considered to correspond with the core network 12 represented in FIG. 1a, and the respective controlling nodes 26, 28 and their associated distributed units/TRPs 22, 24 may be broadly considered to provide functionality corresponding to base stations of FIG. 1a. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 1b within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating. In such cases, as far as the terminal device is concerned, it simply transmits uplink data to the controlling node 26 and receives downlink data from the controlling node 26 and the terminal device has no awareness of the involvement of the distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 1b, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 1b represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1a and 1b.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1a which is adapted to provide functionality in accordance with the principles described herein, and in other examples the network infrastructure equipment may comprise a control unit/controlling node 26, 28 and/or a TRP 22, 24 of the kind shown in FIG. 1b which is adapted to provide functionality in accordance with the principles described herein.

LTE Wireless Access Interface

Those acquainted with LTE will appreciate that a wireless access interface configured in accordance with an LTE standard uses an orthogonal frequency division modulation (OFDM) based wireless access interface for the radio down-link (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
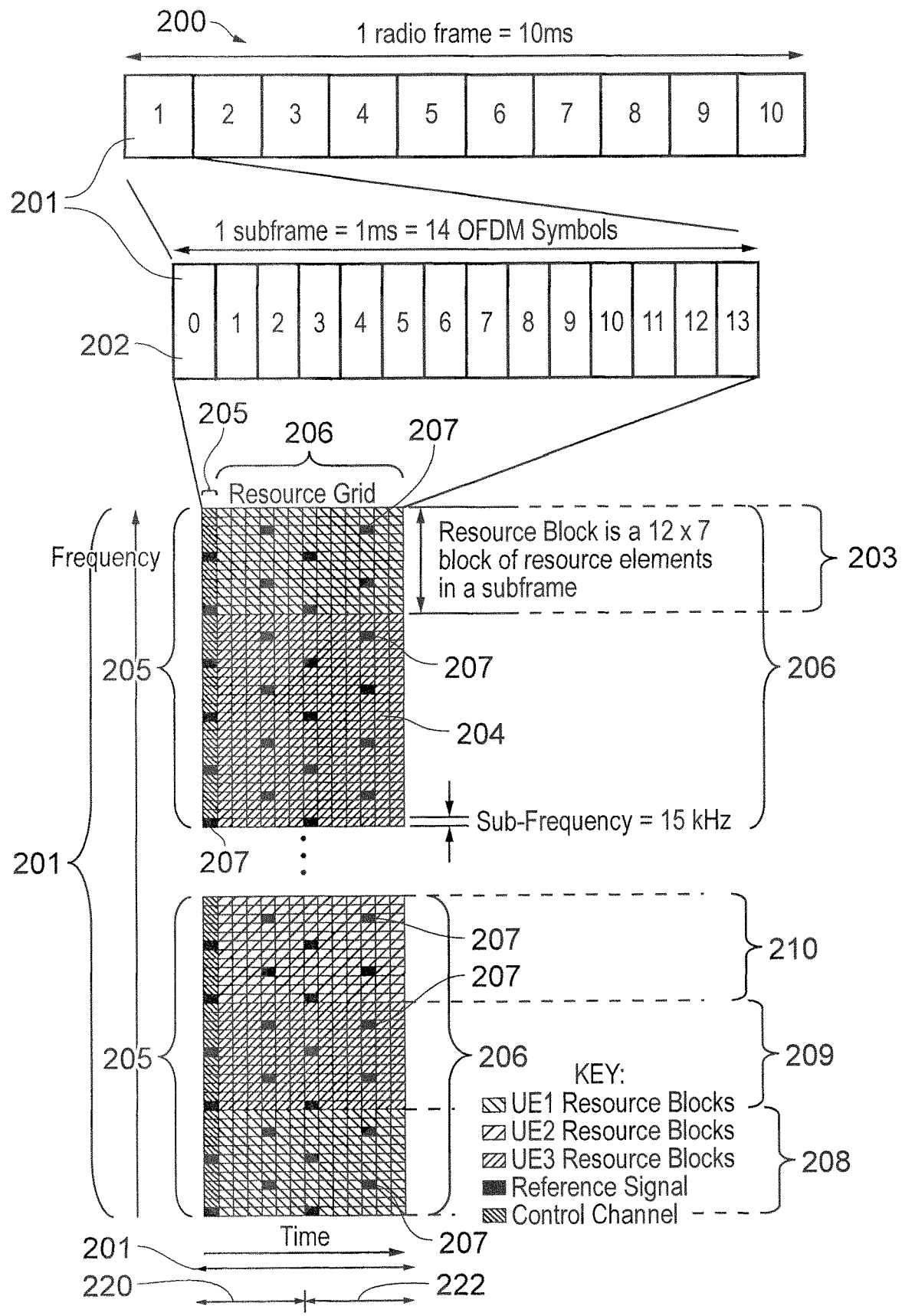
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the base station of FIG. 1a when the communications system is operating in accordance with the LTE standard. In LTE systems the wireless access interface of the downlink from an eNB to a UE is based upon an orthogonal frequency division multiplexing (OFDM) access radio interface.

In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into orthogonal subcarriers. Not all of these subcarriers are used to transmit data (some are used to carry reference information used for channel estimation at the receiver for example) whilst some at the edge of the band are not used at all. For LTE, the number of subcarriers varies between 72 subcarriers (1.4 MHz) and 1200 subcarriers (20 MHz), but it will be appreciated that for other wireless access interfaces, such as NR or 5G, the number of sub-carriers and the bandwidth may be different. Each subcarrier bandwidth may take any value but in LTE it is fixed at 15 kHz.

As shown in FIG. 2, the resources of the wireless access interface are also temporally divided into frames where a frame 200 lasts 10 ms and is subdivided into 10 sub-frames 201 each with a duration of 1 ms. Each sub-frame 201 is formed from 14 OFDM symbols and is divided into two slots 220, 222 each of which comprise six or seven OFDM symbols depending on whether a normal or extended cyclic prefix is being utilised within OFDM symbols for the reduction of inter symbol interference. The resources within a slot may be divided into resources blocks 203 each comprising 12 subcarriers for the duration of one slot and the resource blocks are further divided into resource elements 204 which span one subcarrier for one OFDM symbol, where each rectangle 204 represents a resource element. The resource elements distributed in time within a sub-frame and frequency across the host system bandwidth represent the communications resources of the host system.

The simplified structure of the downlink of an LTE wireless access interface presented in FIG. 2, also includes an illustration of each sub-frame 201, which comprises a control region 205 for the transmission of control data, a data region 206 for the transmission of user data and reference signals 207 which are interspersed in the control and data regions in accordance with a predetermined pattern. The control region 205 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure, ePDCCH and PDSCH are most relevant.

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 2, UE1 has been allocated resources 208 of the data region 206, UE2 resources 209 and UE3 resources 210. UEs in an LTE system may be allocated a fraction of the available resources for the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

Figure 3:
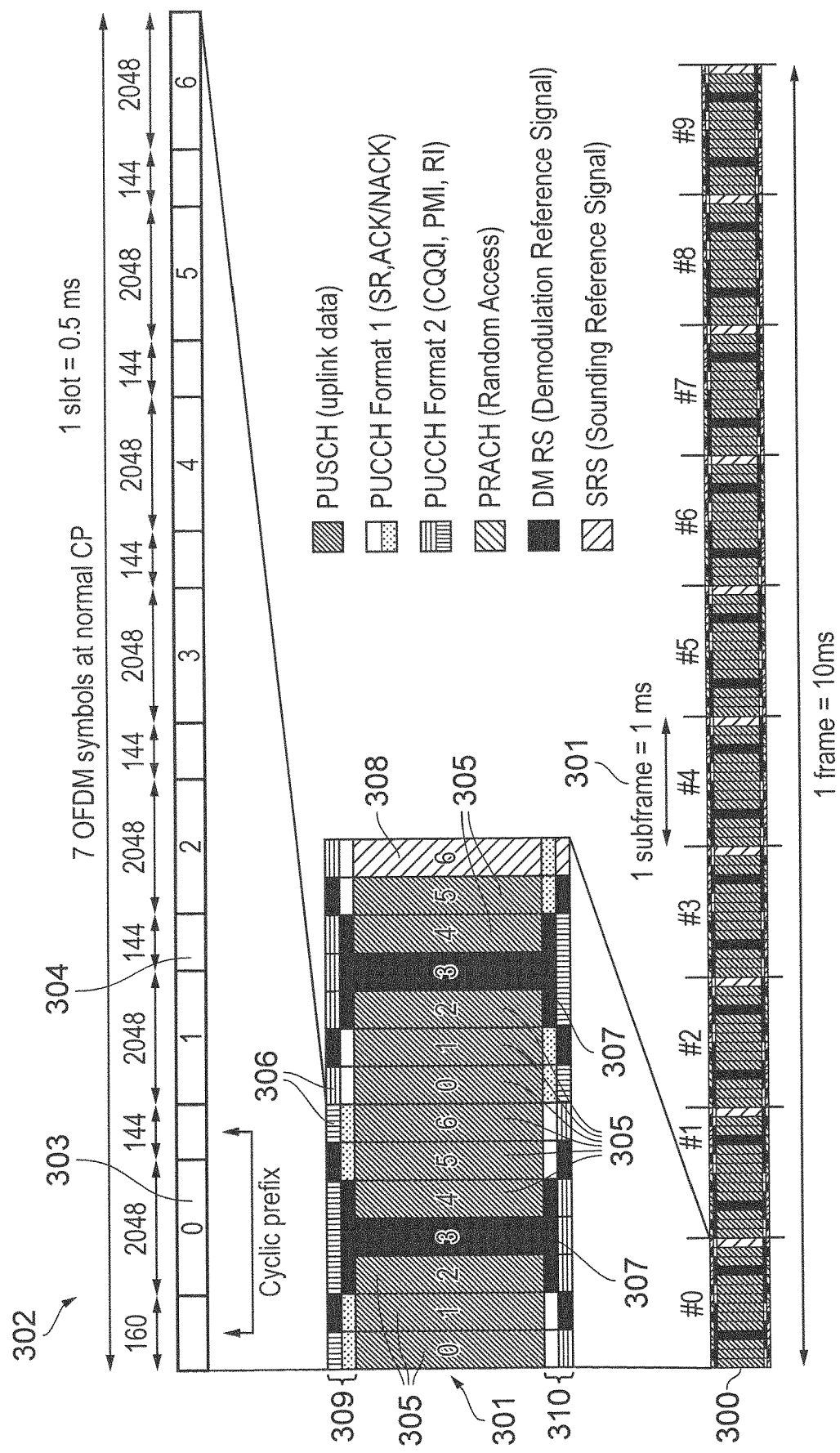
FIG. 3 provides a schematic diagram of an uplink of a wireless access interface of a mobile communications system operating according to an LTE standard.

FIG. 3 provides a simplified schematic diagram of the structure of an uplink of an LTE wireless access interface that may be provided by or in association with the eNodeB of FIG. 1a. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 3 illustrates such an uplink frame in an FDD implementation. A frame 300 is divided into 10 sub-frames 301 of 1 ms duration where each sub-frame 301 comprises two slots 302 of 0.5 ms duration. Each slot is then formed from seven OFDM symbols 303 where a cyclic prefix 304 is inserted between each symbol in a manner equivalent to that in downlink sub-frames.

Physical Layer Transmission and Reception

Figure 4:
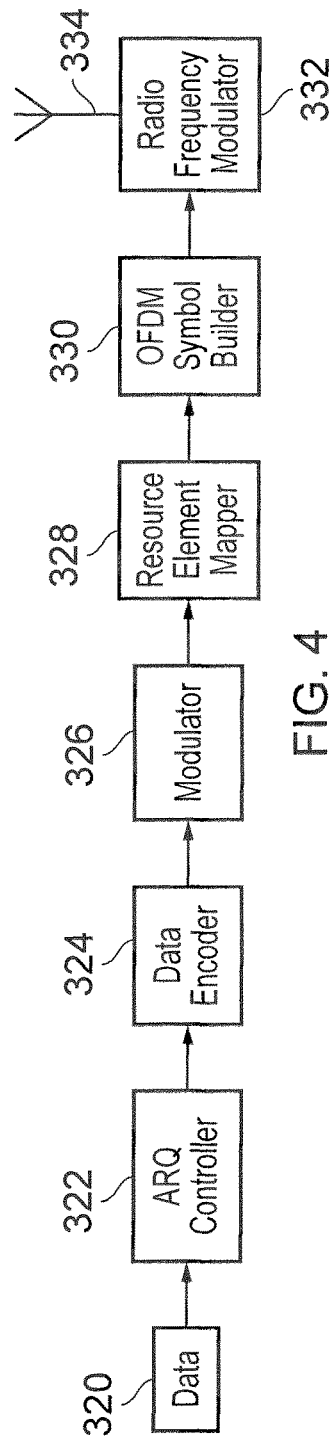
FIG. 4 is a schematic block diagram of an example of a transmitter which may form part of a communications device (UE) or a base station (eNodeB or gNB) of the wireless communications network shown in FIG. 1a or FIG. 1b.
Figure 5:
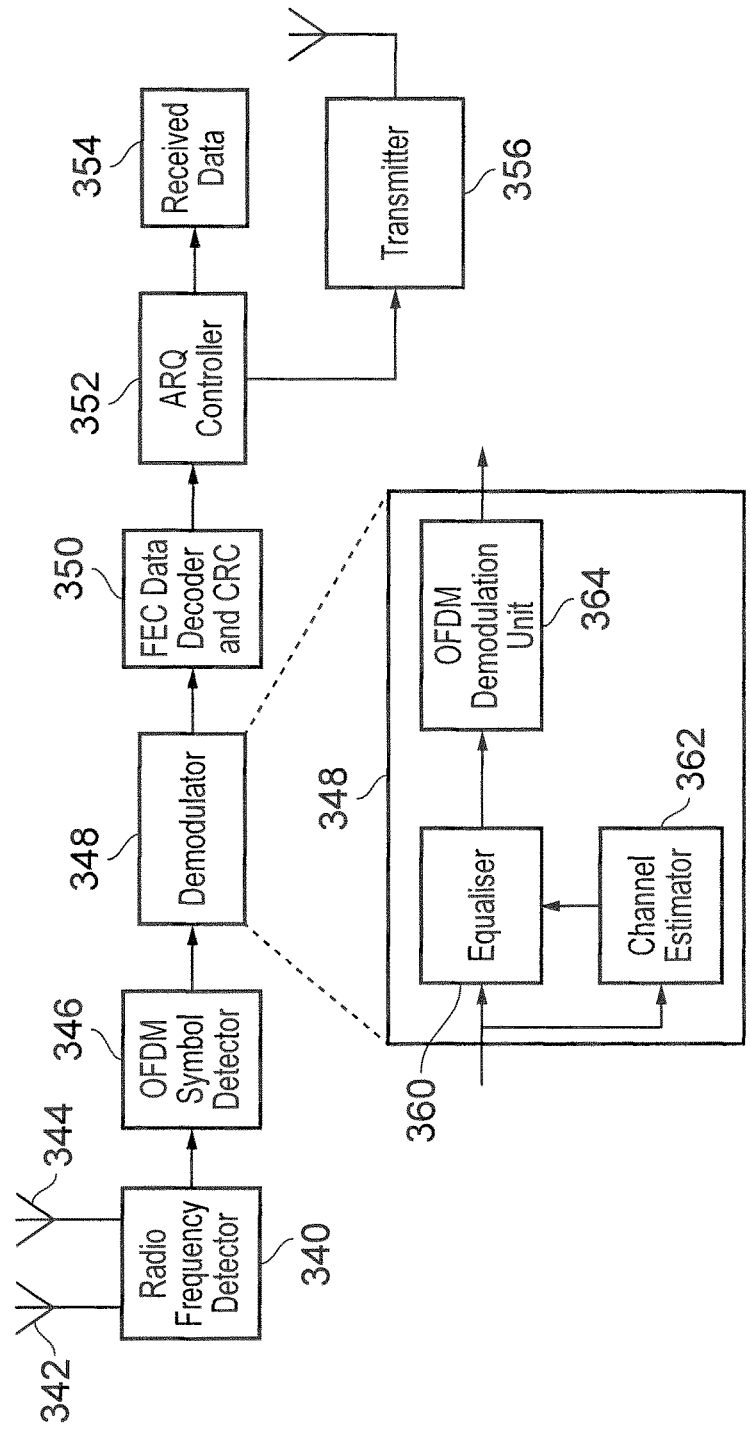
FIG. 5 is a schematic block diagram of an example of a receiver which may form part of a communications device (UE) or a base station (eNodeB or gNB) of the wireless communications network shown in FIG. 1a or FIG. 1b.

Embodiments of the present technique can find application in a transmitter and receiver which employs an OFDM-based waveform to transmit and receive data. Examples of OFDM-based waveforms include the LTE downlink and the LTE uplink, where the LTE uplink uses a Discrete Fourier Transform spread OFDM (DFT-S-OFDM) waveform. The LTE uplink hence implements an OFDM-based Single Carrier Frequency Division Multiple Access scheme (SC-FDMA). References to "OFDM" in the current description hence also apply to an SC-FDMA based waveform, as will be understood by a skilled artisan. As such, embodiments of the present technique can find application in a UE and an eNB of a wireless communications system, which may conform to an NR/5G standard or an LTE standard. An arrangement of signal processing blocks, which may be implemented as integrated circuits or processing units, which may be used to form part of physical layer processing in transmitters and receivers of a wireless communication systems such as those of FIGS. 1a and 1b are illustrated in FIGS. 4 and 5. FIGS. 4 and 5 will now be described in order to gain a better appreciation of the embodiments described in the following paragraphs.

As shown in FIG. 4 a data source 320 feeds data to be transmitted via the wireless access interface in for example the eNB or gNB to an automatic repeat request (ARQ) controller 322. The ARQ controller 322 forms the data from the data source 320 into data units for transmission in one or more subframes of the wireless access interface. The ARQ controller 322 may operate to control transmission of data in accordance with various types of ARQ processes known to those skilled in the art. Such techniques typically involve forming the data to be transmitted into data units, transport blocks or data packets for transmission. The ARQ controller 322 may operate in combination with a data encoder 324 to encode data packets to determine whether they have been correctly received and to improve the likelihood that the data packets are received correctly. In accordance with an ARQ protocol performed by the ARQ controller 322, a receiver may transmit a feedback signal representing either acknowledgement ACK, or a negative acknowledgment NACK in dependence upon whether a data packet has been successfully received or not received successfully. In response to detecting an NACK or not detecting an ACK, the ARQ controller 322 may respond by retransmitting the data unit which was not received correctly. In some examples, the ARQ controller may transmit increasing amounts of redundant data generated by the data encoder 324 in response to an indication that a data packet cannot be decoded. However there are many variations on ARQ protocols and the present technique is not limited to a particular protocol.

The data encoder 324 receives each data unit and performs encoding and scrambling to improve the integrity of the transmitted data and to provide some rejection of co-channel interference. The encoded data is then received at a modulator 326, which maps the data onto modulation symbols and performs other processing tasks to convert the modulation symbols into modulation cells. The modulation cells generated by the modulator 326 are then received by a resource element mapper 328 which maps the modulation cells onto the subcarriers of OFDM symbols which in combination with the OFDM symbol builder 328 generates OFDM symbols. The OFDM symbols are then used to modulate a radio frequency carrier for transmission by an RF modulator 332 from the antenna 334.

As shown in FIG. 5 at the receiver a radio frequency detector may detect the transmitted signal (from the base station or UE as appropriate) using a radio frequency detector 340. The radio frequency detector 340 may in some configurations include a plurality of antennas 342, 344 which may provide a multiple input multiple output (MIMO) or single input, multiple output diversity scheme. An OFDM symbol detector 346 then receives a baseband version of the signal detected by the radio frequency detector and recovers the OFDM symbols. The OFDM symbol detector includes a forward Fast Fourier Transform (FFT) which transforms the time domain signal into the frequency domain. The OFDM symbols are then fed to a demodulator 348, which demodulates the subcarriers to generate for each sub-carrier a received modulation cell, which is then mapped back into the data symbols to reverse operations performed by the modulator. The received data is then fed to the data decoder 350 which performs error correction decoding, descrambling and error detection decoding (for example using a CRC check, which is used to generate the ACK/NACK) to reverse the operations performed at the transmitter by the data encoder 324 in order to improve the integrity of the received data and co-operates with an ARQ controller 352 in the receiver to determine whether data packets transmitted by the transmitter can be correctly received. The ARQ controller 352 therefore generates the ACK/NACK responses for transmission to the transmitter, using a receiver-transmitter 356 included in the entity with the receiver of FIG. 5 to organise the re-transmissions as appropriate. The ARQ controller 352 then reassembles the data units into the data as presented by for example a higher layer application which is forwarded to a data sink.

As shown in FIG. 5 the demodulator 348 includes an equaliser 360, a channel estimator 362 and an OFDM demodulation unit 364. The channel estimator 362 receives the detected OFDM symbol from the OFDM symbol detector 346 and generates an estimate of an impulse response of the channel through which the received OFDM symbol has passed. The impulse response may be generated in the frequency domain as a set of estimated phase and amplitude distortions across the frequency domain. To this end, according to a conventional arrangement, the received OFDM symbol includes reference symbols which transmit known symbols which when correlated with a reproduction of those symbols are used to generate an estimate of the impulse response of the channel. The channel estimate is therefore fed to the equaliser 360, which compensates for the distortions caused by the channel, from the received modulation symbols. The OFDM demodulation unit then demodulates the OFDM symbol to provide log-likelihood ratios (LLRs) on the bits associated with the modulations symbols. The LLRs are an example of soft decision bits. As will be appreciated there are other ways of performing equalisation of the received signal which can be done in the frequency domain or the time domain and therefore the equaliser 360 may form part of the OFDM demodulation unit 364. However the architecture showing in FIG. 5 has been provided in order to illustrate an example embodiment to the present technique which will be explained shortly.

The example transmitter and receiver shown in FIGS. 4 and 5 are configured to transmit data using an ARQ process according to a conventional arrangement of a transmitter and receiver chain. Embodiments of the present technique can provide an arrangement in which the reliability of data communicated by such an example transmitter and receiver chain incorporating an ARQ process can be improved, with an ARQ technique which relies on repeated transmission of data units or packets until that data unit or packet can be successfully decoded. As such embodiments of the present technique can find application with URLLC devices, such as those which find application with LTE or 5G new radio (NR).

Embodiments of the present technique can therefore provide an improvement to communications services, which deliver data with a relatively high reliability and with a relatively low latency. Such communications services therefore present a significant challenge when communicating via wireless access interfaces in which the radio communications conditions vary and the communications device transmitting or receiving the data may be mobile. In one example the communications may provide an ultra reliable low latency communications (URLLC) service, such as that being proposed within 3GPP for 4G and 5G communications networks. In some examples, URLLC communications are either low latency (where the user plane latency target is 1 ms) or high reliability (where the acceptable error rate on URLLC transmissions is $10^{-5}$) or both low latency and high reliability (where both the latency and reliability targets need to be met at the same time).

Various techniques have been proposed in order to achieve the low latency and high reliability targets. Low latency can be achieved through one or more of the following techniques (which can be applied in combination):

Short scheduling interval. Transmissions can be scheduled at frequent intervals. The scheduling interval may be less than the duration of a slot in the frame (e.g. when the slot duration is 1 ms, it may be possible to schedule URLLC every 0.1 ms, i.e. with a scheduling interval of 0.1 ms).

Short TTI. The transmission time interval (TTI) of a URLLC transmission may consist of a small number of OFDM symbols (i.e. much smaller than the duration of a slot).

On the fly decoding format. The format of the URLLC transmission may be designed to allow for "on the fly decoding". For example, reference symbols for channel estimation purposes may be located in the first OFDM symbol of the URLLC transmission and each OFDM symbol within the URLLC transmission can be decoded independently of other OFDM symbols (e.g.

one OFDM symbol contains a whole forward error correction (FEC) codeword).

The short TTI referred to above can be termed a "mini-slot". The scheduling interval may also have an extent of a mini-slot.

High reliability can be achieved through one or more of the following techniques (which can be applied in combination):

Frequency diverse transmissions: Transmission of the URLLC information over a wide bandwidth makes those transmissions resilient to frequency selective fading.

Antenna diversity: Antenna diversity makes the URLLC transmission resilient to frequency selective fading on some of the channels between transmit and receive antennas.

Robust coding and modulation: Use of powerful forward error correction codes and robust modulation formats increases the resilience of the URLLC transmission to noise.

Hybrid ARQ: The URLLC transmission is protected with a cyclic redundancy check (CRC). If the CRC indicates that the URLLC packet is incorrect, the receiver can inform the transmitter of the error and the packet can be re-transmitted.

Repetition: The URLLC transmission can be repeated, such that if an initial reception of the packet fails, a second reception of the packet can be combined with the first reception of the packet to increase the effective signal to noise ratio (SNR) of the received packet and allow decoding of the packet.

HARQ Transmission in LTE

Figure 6:
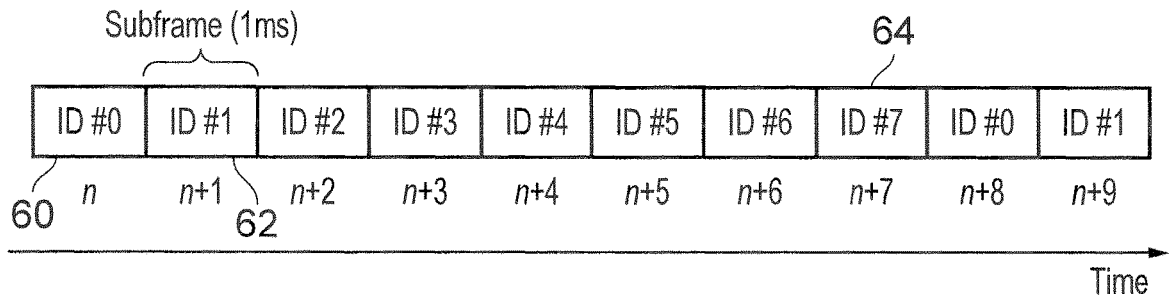
FIG. 6 illustrates an example of synchronous hybrid automatic repeat request (HARQ) operation for a physical uplink shared channel (PUSCH) with 8 HARQ processes.

In LTE, synchronous Hybrid ARQ (HARQ) transmission is supported for PUSCH (uplink) transmission where the HARQ process ID is linked to the subframe, that is, the eNB and UE know which HARQ process is being addressed based on the subframe being processed. In LTE for FDD, there are 8 HARQ processes as shown in FIG. 6 and the HARQ process ID increases in order, for example, if at subframe n 60 the HARQ process ID is 0, then in subframe n+1 62 the HARQ process ID is 1 and so on and the HARQ process ID reverts back to 0 after the $8^{th}$ HARQ process 64, i.e. with ID 7.

Figure 7:
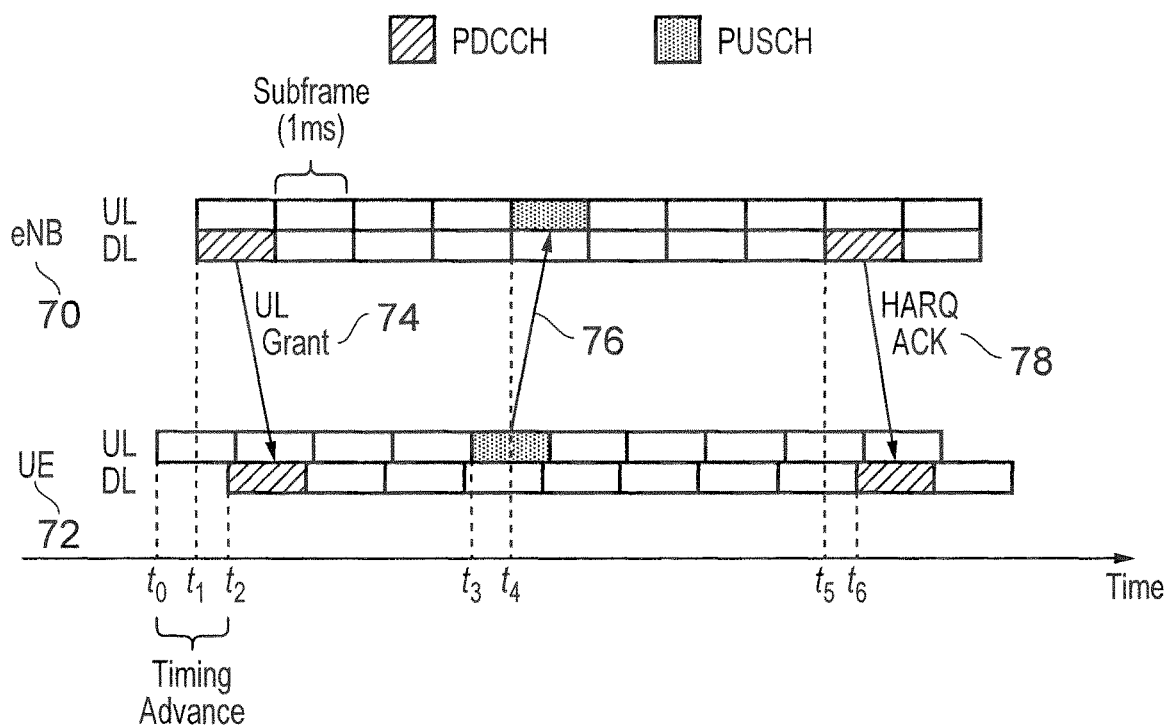
FIG. 7 illustrates an example of a PUSCH HARQ time line.

For PUSCH transmission in LTE, the delay between the PUSCH transmission and the uplink grant and the delay between the uplink HARQ feedback (HARQ-ACK) and the PUSCH transmission are fixed to 4 subframes (i.e. 4 ms). Hence the eNB and UE know when a PUSCH transmission for a specific HARQ process ID is transmitted over the air and when the corresponding HARQ-ACK is expected, without any signalling for the time resource and HARQ process ID. An example is shown in FIG. 7, where the eNB 70 transmits a PDCCH (or EPDCCH) carrying a DCI with an uplink grant 74 (containing scheduled resources for PUSCH) for a UE 72 at time $t_1$, which is received at the UE 72 at time $t_2$ after propagation delay. The time resource, e.g. subframe, for the transmission of the PUSCH 76 is not indicated in the uplink grant 74 but is known to occur four subframes later after the uplink grant 74 at time $t_3$, which is received by the eNB 70 at time $t_4$. Note that due to timing advance the PUSCH is transmitted 76 in advance to account for propagation delay between the eNB 70 and UE 72. The UE 72 would then expect an uplink HARQ-ACK 78 from the eNB 70 four subframes later at time $t_6$.

The type of uplink HARQ-ACK can be adaptive or non-adaptive. In an adaptive HARQ system, the uplink HARQ-ACK is an uplink grant in a DCI carried by a PDCCH (or EPDCCH). Here the DCI will indicate whether this uplink grant is for a new Transport Block (TB) or whether it is a retransmission and it can schedule a different resource (e.g. frequency resource) for the retransmission. LTE also uses non-adaptive HARQ and in LTE, the uplink HARQ-ACK is carried by PHICH (Physical Hybrid-ARQ Indicator Channel) which has 1 bit of information to indicate an ACK (i.e. the PUSCH TB is received successfully) or a NACK (i.e. failed to receive the PUSCH TB). The PHICH does not signal the resource for the PUSCH retransmission but a NACK would implicitly indicate that the same resource used for the previous PUSCH transmission will be scheduled for the PUSCH retransmission.

HARQ Transmission in NR

In NR, an asynchronous HARQ is used for PUSCH transmission, where unlike LTE, there is no fixed association between the subframe and the HARQ process ID. This allows the time resource (i.e. the slot) for PUSCH transmission to be flexible, that is, the time resource (i.e. slot) and HARQ process ID for PUSCH transmission are indicated in the uplink grant.

Unlike LTE where an explicit uplink HARQ-ACK is provided by the eNB at a known time (i.e. 4 subframes after PUSCH transmission), in NR an implicit HARQ-ACK is provided. That is a PUSCH TB of a HARQ process is ACKed (positively acknowledged) if an uplink grant indicates a new PUSCH TB is scheduled (toggling the New Data Indicator bit, potentially the NDI functionality is provided by "Code Block Group Indicator" bits) for the same HARQ process. The PUSCH TB of a HARQ process is NACKed (negatively acknowledged) if an uplink grant does not indicate a new PUSCH TB is scheduled for the same HARQ process and here the resources scheduled are used for retransmission of the PUSCH TB. Therefore unlike LTE, the UE does not know when or whether any uplink HARQ-ACK is transmitted. It should be noted that there may not be any uplink HARQ-ACK feedback at all if there is no new data transmission.

As described above, for URLLC the PUSCH TB needs to have high reliability and low latency. Since in NR the UE does not know when the uplink HARQ-ACK is expected, it is difficult for the UE to determine whether its uplink URLLC transmission is successfully received. This therefore has an impact on the reliability requirement of URLLC. Recognising this, 3GPP proposed to introduce explicit HARQ-ACK for URLLC transmission.

It should be appreciated that the 3GPP NR specifications do not distinguish a PUSCH transmission as URLLC or eMBB but from the layer 1 point of view, it is merely data transmission (i.e. layer 1 is agnostic as to whether the transmission is URLLC or eMBB). Hence, the introduction of explicit HARQ-ACK targeting URLLC transmissions imposes a challenge since layer 1 does not distinguish whether the transmission is for URLLC or eMBB.

Explicit Uplink HARQ-ACK Indicator for URLLC

Embodiments of the present technique allow for wireless communications networks network to transmit an explicit uplink HARQ-ACK indicator to communications devices, where the explicit uplink HARQ-ACK indicator is used to tell the communications devices whether an explicit uplink HARQ-ACK should be expected.

Figure 8:
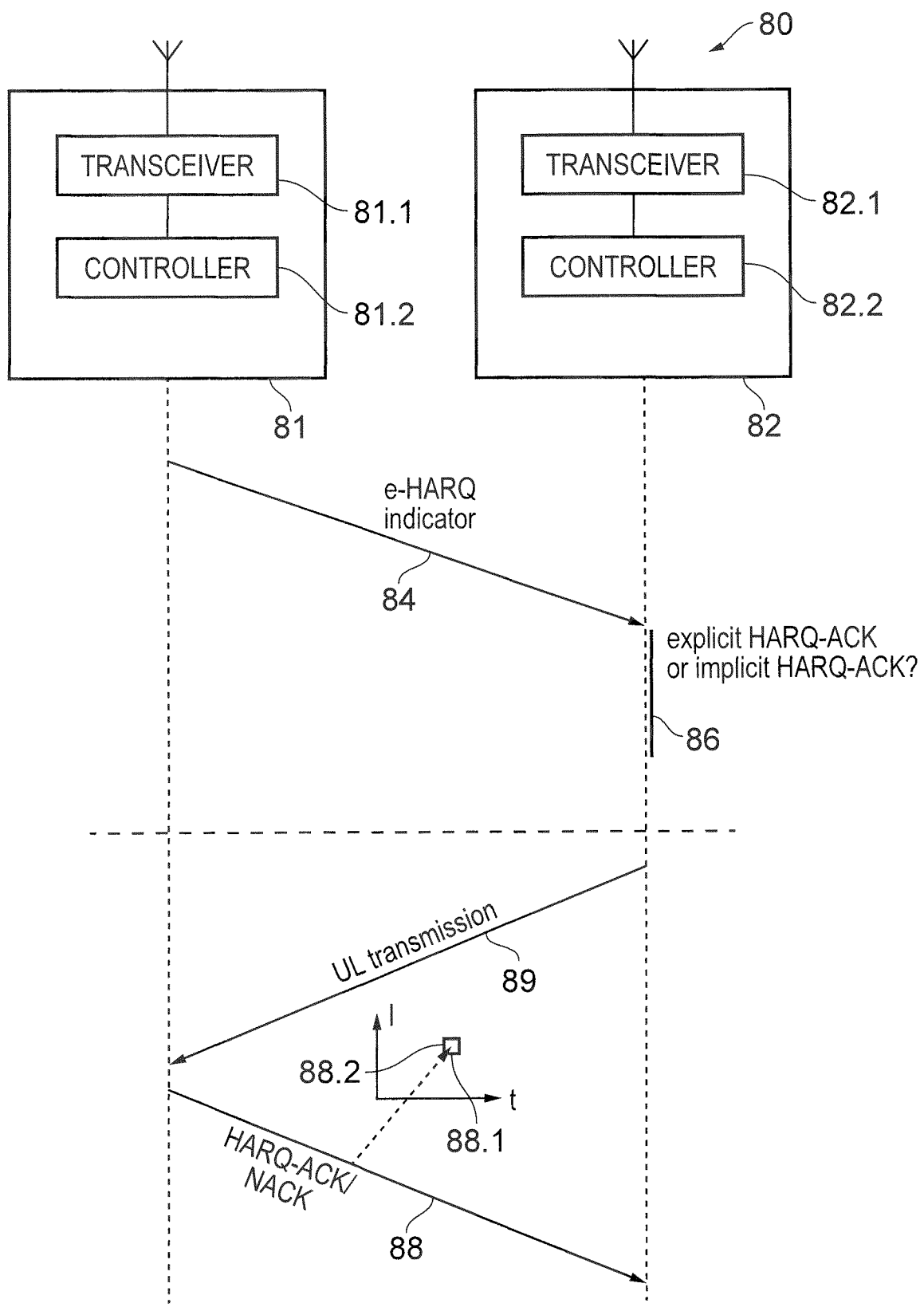
FIG. 8 shows a part schematic, part message flow diagram representation of a communications system in accordance with embodiments of the present technique.

FIG. 8 shows a part schematic, part message flow diagram representation of a communications system 80 in accordance with embodiments of the present technique. The communications system 80 comprises an infrastructure equipment 81 and a communications device 82. Each of the infrastructure equipment 81 and communications device 82 comprise a transceiver (or transceiver circuitry) 81.1, 82.1, and a controller (or controller circuitry) 82.1, 82.2. Each of the controllers 82.1, 82.2 may be, for example, a microprocessor, a CPU, or a dedicated chipset, etc. It will be appreciated by those skilled in the art that, in arrangements of the present technique, the transceiver 82.1 of the communications device 82 may not always include a transmitter, for example in scenarios where the communications device 82 is a low-power wearable device.

As shown in FIG. 8, the communications device 82 is configured to receive 84 an explicit uplink hybrid automatic repeat request acknowledgement indicator, e-HARQ indicator, from the infrastructure equipment 81, and to determine 86, in accordance with the received e-HARQ indicator 84, whether or not the communications device 82 should monitor for a first HARQ acknowledgement 88, HARQ-ACK, in a specific time slot 88.1 and in a specific frequency resource 88.2 of the wireless access interface, the first HARQ-ACK 88 being transmitted by the infrastructure equipment 81 in response to an uplink transmission 89 from the communications device to the infrastructure equipment 81.

Essentially, embodiments of the present technique introduce an explicit uplink HARQ-ACK Indicator (e-HARQ Indicator). The e-HARQ Indicator indicates whether the UE should decode the uplink HARQ-ACK in an explicit manner (e.g. using a PHICH-like channel, as per LTE) or whether it should decode the uplink HARQ-ACK in an implicit manner. By having an indicator to tell the UE to monitor for an explicit uplink HARQ-ACK, there is no need to distinguish whether a PUSCH transmission is for URLLC or eMBB. An indicator will also avoid the UE having to blindly wait for a possible acknowledgement from the gNB: instead, the UE will decode for an explicit HARQ-ACK at a known time and frequency resource. The reduction in blind decoding reduces the rate at which the UE incorrectly decodes the uplink HARQ-ACK (each blind decoding operation allows the potential for an incorrect decoding event).

It should be noted that an explicit uplink HARQ-ACK indicator is transmitted in the downlink and informs the UE whether a future uplink HARQ-ACK (transmitted in the downlink) will be transmitted explicitly or implicitly.

In an arrangement, the said e-HARQ Indicator is transmitted in the DCI where the UE is the recipient or one of the recipients. That is, whether the UE needs to monitor for an explicit HARQ-ACK at a known time and frequency resource is dynamically indicated. This gives the gNB flexibility on which PUSCH transmission to provide an explicit HARQ-ACK. In other words, the controller circuitry is configured to control the transceiver circuitry to receive, as downlink control information, DCI, from the infrastructure equipment, an uplink grant indicating resources of the wireless access interface that the communications device should use for the uplink transmission to the infrastructure equipment, wherein the uplink grant comprises the e-HARQ indicator. This DCI can carry an uplink grant which is specific to the UE or it can be a group common DCI carrying, for example the Slot Format Indicator (SFI). In another example, the Slot Format Indicator which informs a group of UEs on the structure of at least one slot also carries the e-HARQ Indicator. In other words, the controller circuitry is configured to control the transceiver circuitry to receive, as group common DCI from the infrastructure equipment, a Slot Format Indicator indicating a configuration of one or more time divided slots of a wireless access interface provided by the wireless communications network for transmitting data to the communications device on the downlink or receiving data from the communications device on the uplink, wherein the Slot Format Indicator comprises the e-HARQ indicator.

In another arrangement, the said e-HARQ Indicator is configured by the RRC. That is, the e-HARQ Indicator is semi-statically configured and once configured the UE will expect an explicit uplink HARQ-ACK for its PUSCH transmissions. In other words, the controller circuitry is configured to control the transceiver circuitry to receive a radio resource control, RRC, configuration message from the wireless communications network, the RRC configuration message comprising the e-HARQ indicator.

In another arrangement, the said e-HARQ Indicator RRC configuration includes criteria based on the parameters set in the DCI in which the UE is the recipient or one of the recipients, for example an uplink grant or a group common DCI. That is explicit HARQ-ACK is enabled if the said criteria are met in the uplink grant or the DCI where the UE is a recipient. Since the uplink grant is dynamic, this enables the gNB to dynamically set the explicit HARQ-ACK for a PUSCH transmission. That is to say, the values set in the uplink grant implicitly indicate whether the UE should monitor for an explicit HARQ-ACK. In other words, the controller circuitry is configured to control the transceiver circuitry to receive, from the infrastructure equipment, an uplink grant indicating resources of the wireless access interface that the communications device should use for the uplink transmission to the infrastructure equipment, wherein the received e-HARQ indicator is dependent on at least one parameter of the received uplink grant.

In a first example of this arrangement, the said criterion in the RRC configured e-HARQ Indicator is the HARQ process ID. Each HARQ process ID has a corresponding e-HARQ Indicator telling the UE whether to expect an explicit HARQ-ACK. Since the HARQ process ID is indicated in the uplink grant carried by the DCI, by selecting the HARQ process ID the gNB would implicitly also tell the UE whether it will feedback an explicit HARQ-ACK. That is the gNB can dynamically decide whether to transmit an explicit HARQ-ACK by setting the HARQ process ID in the uplink grant. In other words, the at least one parameter of the received uplink grant is an identifier of a HARQ process used by the infrastructure equipment to transmit a HARQ-ACK to the communications device in response to the uplink transmission.

An example is shown in FIG. 9, where the maximum number of HARQ process is configured to be 8 (it should be noted that, in NR, the number of HARQ process is configurable) and an explicit HARQ is configured for HARQ process ID #0, #4 and #5. When there are uplink grants for these HARQ processes={0, 4, 5} the UE monitors for explicit HARQ-ACK at a known time and in a known frequency resource, while for other HARQ processes {1, 2, 3, 6, 7}, the UE does not monitor for explicit HARQ-ACK at all, but instead monitors for an implicit HARQ-ACK in the form of an uplink grant as described above.

In another example of this arrangement, the said criterion in the RRC configured e-HARQ Indicator is the time delay $T_{DCI-PUSCH}$ between the uplink grant and the PUSCH transmission (it should be noted that currently, this time delay is signalled in the uplink grant). That is, if $T_{DCI-PUSCH}$ is less than a threshold $T_{URLLC}$ then the e-HARQ Indicator is enabled, or otherwise it is disabled. The value $T_{URLLC}$ can be RRC configured or specified in the specifications. This example recognises that the URLLC packet has low latency and would therefore require a short $T_{DCI-PUSCH}$ value. Hence, for these PUSCH transmissions, the UE would expect an explicit HARQ-ARQ at known time and frequency resource. In other words, the at least one parameter of the received uplink grant is a time delay between the transmission of the uplink grant by the infrastructure equipment and the transmission of the uplink transmission by the communications device.

In another example of this arrangement, the said criterion in the RRC configured e-HARQ Indicator is the PUSCH Transport Block Size (TBS) scheduled by the uplink grant. An example implementation may be that explicit HARQ-ACK is enabled if the TBS is less than a predefined threshold. This threshold can be RRC configured or can be specified in the specifications. This example recognises that URLLC transmission typically consists of small packets; as described in [3] the expected URLLC packet is 32 bytes. The UE would therefore monitor for explicit HARQ-ACK if the scheduled PUSCH TBS is less than the predetermined threshold. In other words, the at least one parameter of the received uplink grant is a transport block size, TBS, scheduled by the uplink grant.

Alternatively, RRC configures explicit feedback for a logical channel. So, when data related to that particular logical channel is included in the TB, the UE expects an explicit feedback. In an arrangement, the UE only sends an ACK via the explicit HARQ-ACK. This particularly applicable for cases where the logical channel ID can only be accurately determined when the TB is successfully decoded. In an arrangement, an explicit HARQ-ACK is used if the previous scheduling request or buffer status report (sent by the UE to the base station) that was sent indicated that the UE had data to transmit for a logical channel to which explicit HARQ-ACK applied.

In another example of this arrangement, the said criterion in the RRC configured e-HARQ Indicator is a monitoring granularity of PDCCH for the uplink grant. The granularity is configured via RRC for a resource set for PDCCH. An example implementation is that explicit HARQ-ACK is enabled if the granularity is less/more than a predefined threshold. An example of the predefined threshold is a time length of a subframe, i.e. 1 ms. In another example, the predefined threshold is determined based on a subcarrier spacing used for the PDCCH. The granularity may be based on TTI (Transmission Time Interval). In other words, the at least one parameter of the received uplink grant is a granularity used by the communications device to monitor the wireless access interface for the uplink grant from the infrastructure equipment. The granularity may be determined in accordance with a transmission time interval, TTI, of the wireless communications network.

In another arrangement, the said criterion in the RRC configured e-HARQ Indicator is a slot format which may be determined for each symbol based on UE-specific DCI, a Slot Format Indicator (SFI) indicated by Group-Common PDCCH which may be transmitted for a UE group and/or a SFI configured by RRC signaling. The SFI indicates a slot format (e.g. downlink, uplink or flexible) for each symbol in one or more subframes. The Group-Common PDCCH is different from PDCCH for the uplink grant. A UE assumes downlink transmissions to occur in 'downlink' or 'flexible' symbols only. A UE transmits in 'uplink' or 'flexible' symbols only. An example implementation is that explicit HARQ-ACK is enabled if the SFI or the slot format indicates a predefined slot format. In other words, the controller circuitry is configured to control the transceiver circuitry to receive, from the infrastructure equipment, an SFI, the SFI indicating a configuration of one or more time divided slots of a wireless access interface provided by the wireless communications network for transmitting data to the communications device on the downlink or receiving data from the communications device on the uplink, wherein the SFI is provided by one of the RRC configuration message, an SFI communicated in a group communications channel and DCI, and wherein the received e-HARQ indicator is dependent on at least one parameter of the received SFI. In an example of this arrangement, the at least one parameter of the received SFI is the configuration of the one or more time divided slots of the wireless access interface.

It would be appreciated by those skilled in the art that the various criteria discussed in the arrangements above may be implemented together or individually.

In an arrangement, the UE will decode an explicit uplink HARQ-ACK, under control of the e-HARQ Indicator, only if the UE hasn't previously received an implicit HARQ-ACK for that transport block. This can be useful for UE power saving. If the gNB schedules the UE with a final PUSCH transmission (i.e. when the UE buffer status is known to be at, or close to, zero), it can set the e-HARQ Indicator to indicate to the UE that it should look for an explicit uplink HARQ ACK/NACK (after which it can potentially go to sleep). However, if the PUSCH transmission is received in error by the gNB, the gNB can send an implicit uplink HARQ-NACK to the UE, causing the UE to re-transmit the PUSCH. In such an arrangement, the explicit uplink HARQ-ACK would typically be configured to occur at a relatively longer time after the PUSCH transmission. In other words, the controller circuitry is configured to control the transceiver circuitry to determine whether or not the communications device has received a second HARQ-ACK from the infrastructure equipment in response to the uplink transmission, and to monitor for the first HARQ-ACK in the specific time slot and in the specific frequency resource of the wireless access interface in accordance with the received e-HARQ indicator only if the communications device has not received the second HARQ-ACK.

Time Resource for Explicit HARQ-ACK

In another arrangement, the said known time resources where the UE monitors for an explicit HARQ-ACK is fixed in the specifications. This time resource can be referenced as the delay between the end of PUSCH transmission and start of the explicit uplink HARQ-ACK as shown as $T_{HARQ}$ in FIG. 10. Since the URLLC transmission is low latency, the HARQ-ACK should therefore reach the UE as soon as possible, for example in the next slot after the PUSCH transmission (i.e. the value of $T_{HARQ}$ may typically be 1 slot). In other words, the specific time slot in which the communications device should monitor for the first HARQ-ACK is predetermined and is known to the communications device.

In another arrangement, the said know time resource, i.e. $T_{HARQ}$, where the UE monitors for an explicit HARQ-ACK is configured by RRC. In other words, the specific time slot in which the communications device should monitor for the first HARQ-ACK is indicated in an RRC configuration message received by the communications device from the infrastructure equipment.

In another arrangement, the said known time resource, i.e. $T_{HARQ}$, where the UE monitors for an explicit HARQ-ACK is indicated in the uplink grant scheduling the PUSCH transmission. That is, the time resource is dynamically scheduled by the gNB. In other words, the controller circuitry is configured to control the transceiver circuitry to receive, from the infrastructure equipment, an uplink grant indicating resources of the wireless access interface that the communications device should use for the uplink transmission to the infrastructure equipment, wherein the specific time slot in which the communications device should monitor for the first HARQ-ACK is indicated in the uplink grant.

In another arrangement, the said known time resource, i.e. $T_{HARQ}$, where the UE monitors for an explicit HARQ-ACK is implicitly indicated by the time delay $T_{DCI-PUSCH}$ between the uplink grant and the PUSCH transmission. That is, the UE would derive $T_{HARQ}$ from $T_{DCI-PUSCH}$ using a known function in the specifications. An example is that $T_{HARQ}$ is proportional to $T_{DCI-PUSCH}$. That is, when $T_{DCI-PUSCH}$ increases, $T_{HARQ}$ increases. It should be appreciated that this is an example function and other functions are possible. In other words, the controller circuitry is configured to control the transceiver circuitry to determine the specific time slot in which the communications device should monitor for the first HARQ-ACK in accordance with a time delay between the transmission of the uplink grant by the infrastructure equipment and the transmission of the uplink transmission by the communications device In another arrangement, the said time resource where the UE monitors for an explicit HARQ-ACK consists of a time window $W_{HARQ}$ of N consecutive slots where the explicit HARQ-ACK can be transmitted in one or more of these N consecutive slots. The value N can be specified in the specifications or configured by RRC. The UE would therefore monitor this time window and decode each slot for possible explicit HARQ-ACK. In other words, the specific time slot in which the communications device should monitor for the first HARQ-ACK is one of a plurality of consecutive time slots forming a time window, and the communications device is configured to monitor one or more of the plurality of consecutive time slots of the time window for the first HARQ-ACK.

This arrangement provides flexibility for the gNB to schedule the explicit HARQ-ARQ and also allows for the explicit HARQ-ACK to be repeated for higher reliability. An example is shown in FIG. 11, where the time window $W_{HARQ}$ consists of N=4 slots that starts at time $t_4$ and ends at time $t_8$. The UE monitors these N=4 slots for explicit HARQ-ACK and here the explicit HARQ-ACK is repeated twice between time $t_5$ and $t_7$.

Frequency Resource for Explicit HARQ-ACK

In another arrangement, the said frequency resources where the UE monitors for an explicit HARQ-ACK is RRC configured. In other words, the specific frequency resource in which the communications device should monitor for the first HARQ-ACK is indicated in an RRC configuration message received by the communications device from the infrastructure equipment.

In another arrangement, the said RRC configured frequency resource carries a PHICH. Here, a non-adaptive HARQ is used where the PHICH carries a single bit indicating an ACK or a NACK. In other words, the specific frequency resource in which the communications device should monitor for the first HARQ-ACK contains a physical hybrid ARQ indicator channel, PHICH, wherein the PHICH comprises a single bit indicating a positive acknowledgement or a negative acknowledgement. Hence, the e-HARQ indicator acts as a switch to enable or disable PHICH for a particular UE.

In another arrangement, the said RRC configured frequency resource carries an uplink grant, i.e. the explicit HARQ-ACK is an adaptive HARQ. That is the frequency resource is a PDCCH search space where the UE monitors for an explicit uplink HARQ-ACK in the form of an uplink grant. In other words, the specific frequency resource in which the communications device should monitor for the first HARQ-ACK contains an uplink grant indicating resources of the wireless access interface that the communications device should use for the uplink transmission to the infrastructure equipment.

In another arrangement the UE monitors the time and frequency resources carrying the PHICH (non-adaptive HARQ) and also for uplink grant (adaptive HARQ). This arrangement has the benefit that the reliability is increased when both the PHICH and uplink grant transmit the explicit HARQ-ACK. Of course, the gNB can also use one of these resources for the transmission of the explicit HARQ-ACK where the UE would reduce its overhead if the scheduled resources for retransmission is the same and uses PHICH and if the gNB wishes to change the retransmission resources it can use an uplink grant. In other words, the controller circuitry is configured to control the transceiver circuitry to monitor for the first HARQ acknowledgement, HARQ-ACK, in a first specific time slot and in a first specific frequency resource of the wireless access interface, and to monitor for the first HARQ acknowledgement, HARQ-ACK, in a second specific time slot and in a second specific frequency resource of the wireless access interface, wherein the first specific frequency resource contains a PHICH comprising a single bit indicating a positive acknowledgement or a negative acknowledgement, and wherein the second specific frequency contains an uplink grant indicating resources of the wireless access interface that the communications device should use for the uplink transmission to the infrastructure equipment.

In an arrangement, there is more than one frequency resource where the UE monitors for an explicit HARQ-ACK. For example, the gNB can configure the UE to monitor 'N' frequency resources for the explicit HARQ-ACK. In other words, the specific frequency resource in which the communications device should monitor for the first HARQ-ACK is one of a plurality of frequency resources, and the communications device is configured to monitor each of the plurality of frequency resources for the first HARQ-ACK. In such an arrangement, the following functionalities are possible:

- UE monitors all 'N' frequency resources and if at least one resource indicates NACK, the UE re-transmits the PUSCH. This increases PUSCH reliability and reduces latency for URLLC use cases (if it is not certain that a PUSCH has been received by the gNB, the UE re-transmits the PUSCH). In other words, if one or more of the plurality of frequency resources comprise a negative acknowledgement, the communications device is configured to re-transmit the uplink transmission to the infrastructure equipment.
- UE monitors all 'N' frequency resources and if all the resources indicate ACK, the UE flushes the UL transmit data from its buffers. This increases PUSCH reliability for URLLC use cases (the UE only flushes its uplink transmit buffers if it is sure that the uplink data has been received by the gNodeB and there will not be a future request to re-transmit that uplink data). In other words, if all of the plurality of frequency resources comprise a positive acknowledgement, the communications device is configured to clear the data transmitted as the uplink transmission from a buffer of the communications device.
- The UE performs soft combining on the 'N' frequency resources. This provides frequency diversity for the uplink HARQ-ACK feedback channel.

It would be appreciated by those skilled in the art that the time resource for PHICH and the uplink grant carrying the explicit HARQ-ACK need not be the same.

Grant-Free Transmission

A PUSCH can be transmitted using grant-free uplink resources where a set of uplink resources is configured for the UE to use without an explicit uplink grant from the gNB. In other words, the controller circuitry is configured to control the transceiver circuitry to determine that the communications device has been assigned grant-free resources of the wireless access interface by the infrastructure equipment, to determine, without reception of an uplink grant from the infrastructure equipment, resources of the grant-free resources of the wireless access interface that the communications device should use for the uplink transmission to the infrastructure equipment, and to transmit the uplink transmission to the infrastructure equipment in the determined resources.

Grant-free resource can be configured for multiple UEs and hence contention may occur. Therefore in another arrangement, the uplink resources where explicit HARQ-ACK is used are indicated by the network, i.e. RRC configured. The RRC configuration for the e-HARQ Indicator includes the subset of grant-free resources where explicit HARQ is enabled. Hence a UE with URLLC transmission will use these grant-free resources in order to receive an explicit HARQ-ACK. In other words, the communications device is configured to receive an RRC configuration message from the infrastructure equipment, the RRC configuration message comprising an indication of a subset of the resources of the wireless access interface in which a HARQ-ACK may be transmitted by the infrastructure equipment.

In another arrangement for grant-free PUSCH transmission, the e-HARQ Indicator is derived from the PUSCH transmission parameters. That is whether the UE should monitor for an explicit HARQ-ACK depends on the characteristics of its PUSCH transmission. In other words, the controller circuitry is configured to control the transceiver circuitry to determine whether or not the communications device should monitor for the first HARQ acknowledgement, HARQ-ACK, in a specific time slot and in a specific frequency resource of the wireless access interface dependent on a characteristic of the uplink transmission by the communications device to the infrastructure equipment in the determined resources.

In another arrangement, the said PUSCH characteristic used for e-HARQ Indication in grant-free transmission is the HARQ process ID. Similar to the arrangement above, the RRC configures which HARQ process has explicit HARQ-ACK. In other words, the characteristic of the uplink transmission is an identifier of a HARQ process used by the infrastructure equipment to transmit a HARQ-ACK to the communications device in response to the uplink transmission.

In another arrangement, the said PUSCH characteristic used for e-HARQ Indication in grant-free transmission is the TBS of the PUSCH. If the TBS is smaller than a threshold, then the UE expects an explicit HARQ-ACK. This threshold can be configured by RRC or specified in the specifications. In other words, the characteristic of the uplink transmission is a TBS of the uplink transmission.

In another arrangement, the e-HARQ Indicator is derived based on whether the UE is assigned grant-free resources or not. For example, if the UE is configured with grant-free resources, the UE derives that there is an implicit e-HARQ Indicator instructing the UE to monitor an explicit uplink HARQ ACK indication. This arrangement is useful for cases where URLLC transmissions are so latency critical that there is no time to provide an uplink grant to the UE and hence grant-free transmissions are preferred for URLLC. In other words, the controller circuitry is configured to control the transceiver circuitry to determine whether or not the communications device should monitor for the first HARQ acknowledgement, HARQ-ACK, in a specific time slot and in a specific frequency resource of the wireless access interface dependent on whether or not the communications device determines that the communications device has been assigned grant-free resources of the wireless access interface by the infrastructure equipment.

It should be appreciated by those skilled in the art that other Q protocols to HARQ may be utilised by embodiments of the present technique.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A communications device configured to receive data from an infrastructure equipment of a wireless communications network, the communications device comprising transceiver circuitry configured to transmit signals and to receive signals via a wireless access interface provided by the wireless communications network, and controller circuitry configured to control the transceiver circuitry to receive an explicit uplink hybrid automatic repeat request acknowledgement indicator, e-HARQ indicator, from the infrastructure equipment, and to determine, in accordance with the received e-HARQ indicator, whether or not the communications device should monitor for a first HARQ acknowledgement, HARQ-ACK, in a specific time slot and in a specific frequency resource of the wireless access interface, the first HARQ-ACK being transmitted by the infrastructure equipment in response to an uplink transmission from the communications device to the infrastructure equipment.

Paragraph 2. A communications device according to Paragraph 1, wherein the controller circuitry is configured to control the transceiver circuitry to receive, as downlink control information, DCI, from the infrastructure equipment, an uplink grant indicating resources of the wireless access interface that the communications device should use for the uplink transmission to the infrastructure equipment, wherein the uplink grant comprises the e-HARQ indicator.

Paragraph 3. A communications device according to Paragraph 1 or Paragraph 2, wherein the controller circuitry is configured to control the transceiver circuitry to receive, as group common DCI from the infrastructure equipment, a Slot Format Indicator indicating a configuration of one or more time divided slots of a wireless access interface provided by the wireless communications network for transmitting data to the communications device on the downlink or receiving data from the communications device on the uplink, wherein the Slot Format Indicator comprises the e-HARQ indicator.

Paragraph 4. A communications device according to any of Paragraphs 1 to 3, wherein the controller circuitry is configured to control the transceiver circuitry
to receive a radio resource control, RRC, configuration message from the wireless communications network, the RRC configuration message comprising the e-HARQ indicator.

Paragraph 5. A communications device according to Paragraph 4, wherein the controller circuitry is configured to control the transceiver circuitry
to receive, from the infrastructure equipment, an SFI, the SFI indicating a configuration of one or more time divided slots of a wireless access interface provided by the wireless communications network for transmitting data to the communications device on the downlink or receiving data from the communications device on the uplink,
wherein the SFI is provided by one of the RRC configuration message, an SFI communicated in a group communications channel and DCI, and
wherein the received e-HARQ indicator is dependent on at least one parameter of the received SFI.

Paragraph 6. A communications device according to Paragraph 5, wherein the at least one parameter of the received SFI is the configuration of the one or more time divided slots of the wireless access interface.

Paragraph 7. A communications device according to any of Paragraphs 4 to 6, wherein the controller circuitry is configured to control the transceiver circuitry
to receive, from the infrastructure equipment, an uplink grant indicating resources of the wireless access interface that the communications device should use for the uplink transmission to the infrastructure equipment,
wherein the received e-HARQ indicator is dependent on at least one parameter of the received uplink grant.

Paragraph 8. A communications device according to Paragraph 7, wherein the at least one parameter of the received uplink grant is an identifier of a HARQ process used by the infrastructure equipment to transmit a HARQ-ACK to the communications device in response to the uplink transmission.

Paragraph 9. A communications device according to Paragraph 7 or Paragraph 8, wherein the at least one parameter of the received uplink grant is a time delay between the transmission of the uplink grant by the infrastructure equipment and the transmission of the uplink transmission by the communications device.

Paragraph 10. A communications device according to any of Paragraphs 7 to 9, wherein the at least one parameter of the received uplink grant is a transport block size, TBS, scheduled by the uplink grant.

Paragraph 11. A communications device according to any of Paragraphs 7 to 10, wherein the at least one parameter of the received uplink grant is a granularity used by the communications device to monitor the wireless access interface for the uplink grant from the infrastructure equipment.

Paragraph 12. A communications device according to Paragraph 11, wherein the granularity is determined in accordance with a transmission time interval, TTI, of the wireless communications network.

Paragraph 13. A communications device according to any of Paragraphs 1 to 12, wherein the controller circuitry is configured to control the transceiver circuitry
to determine whether or not the communications device has received a second HARQ-ACK from the infrastructure equipment in response to the uplink transmission, and
to monitor for the first HARQ-ACK in the specific time slot and in the specific frequency resource of the wireless access interface in accordance with the received e-HARQ indicator only if the communications device has not received the second HARQ-ACK.

Paragraph 14. A communications device according to any of Paragraphs 1 to 13, wherein the specific time slot in which the communications device should monitor for the first HARQ-ACK is predetermined and is known to the communications device.

Paragraph 15. A communications device according to any of Paragraphs 1 to 14, wherein the specific time slot in which the communications device should monitor for the first HARQ-ACK is indicated in an RRC configuration message received by the communications device from the infrastructure equipment.

Paragraph 16. A communications device according to any of Paragraphs 1 to 15, wherein the controller circuitry is configured to control the transceiver circuitry
to receive, from the infrastructure equipment, an uplink grant indicating resources of the wireless access interface that the communications device should use for the uplink transmission to the infrastructure equipment,
wherein the specific time slot in which the communications device should monitor for the first HARQ-ACK is indicated in the uplink grant.

Paragraph 17. A communications device according to any of Paragraphs 1 to 16, wherein the controller circuitry is configured to control the transceiver circuitry
to determine the specific time slot in which the communications device should monitor for the first HARQ-ACK in accordance with a time delay between the transmission of the uplink grant by the infrastructure equipment and the transmission of the uplink transmission by the communications device.

Paragraph 18. A communications device according to any of Paragraphs 1 to 17, wherein the specific time slot in which the communications device should monitor for the first HARQ-ACK is one of a plurality of consecutive time slots forming a time window, and the communications device is configured to monitor one or more of the plurality of consecutive time slots of the time window for the first HARQ-ACK.

Paragraph 19. A communications device according to any of Paragraphs 1 to 18, wherein the specific frequency resource in which the communications device should monitor for the first HARQ-ACK is indicated in an RRC configuration message received by the communications device from the infrastructure equipment.

Paragraph 20. A communications device according to Paragraph 19, wherein the specific frequency resource in which the communications device should monitor for the first HARQ-ACK contains a physical hybrid ARQ indicator channel, PHICH,
wherein the PHICH comprises a single bit indicating a positive acknowledgement or a negative acknowledgement.

Paragraph 21. A communications device according to Paragraph 19 or Paragraph 20, wherein the specific frequency resource in which the communications device should monitor for the first HARQ-ACK contains an uplink grant indicating resources of the wireless access interface that the communications device should use for the uplink transmission to the infrastructure equipment.

Paragraph 22. A communications device according to any of Paragraphs 1 to 21, wherein the controller circuitry is configured to control the transceiver circuitry
- to monitor for the first HARQ acknowledgement, HARQ-ACK, in a first specific time slot and in a first specific frequency resource of the wireless access interface, and to monitor for the first HARQ acknowledgement, HARQ-ACK, in a second specific time slot and in a second specific frequency resource of the wireless access interface,
- wherein the first specific frequency resource contains a PHICH comprising a single bit indicating a positive acknowledgement or a negative acknowledgement, and
- wherein the second specific frequency contains an uplink grant indicating resources of the wireless access interface that the communications device should use for the uplink transmission to the infrastructure equipment.

Paragraph 23. A communications device according to any of Paragraphs 1 to 22, wherein the specific frequency resource in which the communications device should monitor for the first HARQ-ACK is one of a plurality of frequency resources, and the communications device is configured to monitor each of the plurality of frequency resources for the first HARQ-ACK.

Paragraph 24. A communications device according to Paragraph 23, wherein if one or more of the plurality of frequency resources comprise a negative acknowledgement, the communications device is configure to re-transmit the uplink transmission to the infrastructure equipment.

Paragraph 25. A communications device according to Paragraph 23 or Paragraph 24, wherein if all of the plurality of frequency resources comprise a positive acknowledgement, the communications device is configured to clear the data transmitted as the uplink transmission from a buffer of the communications device.

Paragraph 26. A communications device according to any of Paragraphs 23 to 25, wherein the communications device is configured to perform a soft combining process on the plurality of frequency resources.

Paragraph 27. A communications device according to any of Paragraphs 1 to 26, wherein the controller circuitry is configured to control the transceiver circuitry
- to determine that the communications device has been assigned grant-free resources of the wireless access interface by the infrastructure equipment,
- to determine, without reception of an uplink grant from the infrastructure equipment, resources of the grant-free resources of the wireless access interface that the communications device should use for the uplink transmission to the infrastructure equipment, and
- to transmit the uplink transmission to the infrastructure equipment in the determined resources.

Paragraph 28. A communications device according to Paragraph 27, wherein the communications device is configured to receive an RRC configuration message from the infrastructure equipment, the RRC configuration message comprising an indication of a subset of the resources of the wireless access interface in which the first HARQ-ACK may be transmitted by the infrastructure equipment.

Paragraph 29. A communications device according to Paragraph 27 or Paragraph 28, wherein the controller circuitry is configured to control the transceiver circuitry
- to determine whether or not the communications device should monitor for the first HARQ acknowledgement, HARQ-ACK, in a specific time slot and in a specific frequency resource of the wireless access interface dependent on a characteristic of the uplink transmission by the communications device to the infrastructure equipment in the determined resources.

Paragraph 30. A communications device according to Paragraph 29, wherein the characteristic of the uplink transmission is an identifier of a HARQ process used by the infrastructure equipment to transmit a HARQ-ACK to the communications device in response to the uplink transmission.

Paragraph 31. A communications device according to Paragraph 29 or Paragraph 30, wherein the characteristic of the uplink transmission is a TBS of the uplink transmission.

Paragraph 32. A communications device according to any of Paragraphs 27 to 31, wherein the controller circuitry is configured to control the transceiver circuitry
- to determine whether or not the communications device should monitor for the first HARQ acknowledgement, HARQ-ACK, in a specific time slot and in a specific frequency resource of the wireless access interface dependent on whether or not the communications device determines that the communications device has been assigned grant-free resources of the wireless access interface by the infrastructure equipment.

Paragraph 33. A method of operating a communications device configured to receive data from an infrastructure equipment of a wireless communications network, the method comprising
- receiving an explicit uplink hybrid automatic repeat request acknowledgement indicator, e-HARQ indicator, from the infrastructure equipment, and
- determining, in accordance with the received e-HARQ indicator, whether or not the communications device should monitor for a first HARQ acknowledgement, HARQ-ACK, in a specific time slot and in a specific frequency resource of a wireless access interface provided by the wireless communications network, the first HARQ-ACK being transmitted by the infrastructure equipment in response to an uplink transmission from the communications device to the infrastructure equipment.

Paragraph 34. Circuitry for a communications device configured to receive data from an infrastructure equipment of a wireless communications network, the communications device comprising
- transceiver circuitry configured to transmit signals and to receive signals via a wireless access interface provided by the wireless communications network, and
- controller circuitry configured to control the transceiver circuitry
  - to receive explicit an uplink hybrid automatic repeat request acknowledgement indicator, e-HARQ indicator, from the infrastructure equipment, and
  - to determine, in accordance with the received e-HARQ indicator, whether or not the communications device should monitor for a first HARQ acknowledgement, HARQ-ACK, in a specific time slot and in a specific frequency resource of the wireless access interface, the first HARQ-ACK being transmitted by the infrastructure equipment in response to an uplink transmission from the communications device to the infrastructure equipment.

Paragraph 35. An infrastructure equipment forming part of a wireless communications network, the infrastructure equipment comprising transceiver circuitry configured to transmit signals and to receive signals via a wireless access interface provided by the wireless communications network, and controller circuitry configured to control the transceiver circuitry to transmit an explicit uplink hybrid automatic repeat request acknowledgement indicator, e-HARQ indicator, to a communications device, wherein the e-HARQ indicator indicates to the communications device whether or not the communications device should monitor for a first HARQ acknowledgement, HARQ-ACK, in a specific time slot and in a specific frequency resource of the wireless access interface, the first HARQ-ACK being transmitted by the infrastructure equipment in response to an uplink transmission from the communications device to the infrastructure equipment.

Paragraph 36. A method of operating an infrastructure equipment forming part of a wireless communications network, the method comprising transmitting an explicit uplink hybrid automatic repeat request acknowledgement indicator, e-HARQ indicator, to a communications device, wherein the e-HARQ indicator indicates to the communications device whether or not the communications device should monitor for a first HARQ acknowledgement, HARQ-ACK, in a specific time slot and in a specific frequency resource of a wireless access interface provided by the wireless communications network, the first HARQ-ACK being transmitted by the infrastructure equipment in response to an uplink transmission from the communications device to the infrastructure equipment.

Paragraph 37. Circuitry for an infrastructure equipment forming part of a wireless communications network, the infrastructure equipment comprising transceiver circuitry configured to transmit signals and to receive signals via a wireless access interface provided by the wireless communications network, and controller circuitry configured to control the transceiver circuitry to transmit an explicit uplink hybrid automatic repeat request acknowledgement indicator, e-HARQ indicator, to a communications device, wherein the e-HARQ indicator indicates to the communications device whether or not the communications device should monitor for a first HARQ acknowledgement, HARQ-ACK, in a specific time slot and in a specific frequency resource of the wireless access interface, the first HARQ-ACK being transmitted by the infrastructure equipment in response to an uplink transmission from the communications device to the infrastructure equipment.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-172834, "Revised WID on New Radio Access Technology," NTT DOCOMO, #78.
[3] TR 38.913, "Study on Scenarios and Requirements for Next Generation Access Technologies (Release 14)".

What is claimed is:

1. A communications device configured to receive data from an infrastructure equipment of a wireless communications network, the communications device comprising transceiver circuitry configured to transmit signals and to receive signals via a wireless access interface provided by the wireless communications network, and controller circuitry configured to control the transceiver circuitry to receive an explicit uplink hybrid automatic repeat request acknowledgement indicator, e-HARQ indicator, from the infrastructure equipment, and to determine, in accordance with the received e-HARQ indicator, whether or not the communications device should monitor for a first HARQ acknowledgement, HARQ-ACK, in a specific time slot and in a specific frequency resource of the wireless access interface, the first HARQ-ACK being transmitted by the infrastructure equipment in response to an uplink transmission from the communications device to the infrastructure equipment, wherein the specific time slot in which the communications device should monitor for the first HARQ-ACK is one of a plurality of consecutive time slots forming a time window, and the communications device is configured to monitor one or more of the plurality of consecutive time slots of the time window for the first HARQ-ACK.

2. The communications device according to claim 1, wherein the controller circuitry is configured to control the transceiver circuitry to receive, as downlink control information, DCI, from the infrastructure equipment, an uplink grant indicating resources of the wireless access interface that the communications device should use for the uplink transmission to the infrastructure equipment, wherein the uplink grant comprises the e-HARQ indicator.

3. The communications device according to claim 1, wherein the controller circuitry is configured to control the transceiver circuitry
- to receive, as group common DCI from the infrastructure equipment, a Slot Format Indicator indicating a configuration of one or more time divided slots of a wireless access interface provided by the wireless communications network for transmitting data to the communications device on the downlink or receiving data from the communications device on the uplink,
- wherein the Slot Format Indicator comprises the e-HARQ indicator.

4. The communications device according to claim 1, wherein the controller circuitry is configured to control the transceiver circuitry
- to receive a radio resource control, RRC, configuration message from the wireless communications network, the RRC configuration message comprising the e-HARQ indictor.

5. The communications device according to claim 4, wherein the controller circuitry is configured to control the transceiver circuitry
- to receive, from the infrastructure equipment, a Slot Format Indicator, SFI, the SFI indicating a configuration of one or more time divided slots of a wireless access interface provided by the wireless communications network for transmitting data to the communications device on the downlink or receiving data from the communications device on the uplink,
- wherein the SFI is provided by one of the RRC configuration message, an SFI communicated in a group communications channel and DCI, and
- wherein the received e-HARQ indictor is dependent on at least one parameter of the received SFI.

6. The communications device according to claim 5, wherein the at least one parameter of the received SFI is the configuration of the one or more time divided slots of the wireless access interface.

7. The communications device according to claim 4, wherein the controller circuitry is configured to control the transceiver circuitry
- to receive, from the infrastructure equipment, an uplink grant indicating resources of the wireless access interface that the communications device should use for the uplink transmission to the infrastructure equipment,
- wherein the received e-HARQ indictor is dependent on at least one parameter of the received uplink grant.

8. The communications device according to claim 7, wherein the at least one parameter of the received uplink grant is an identifier of a HARQ process used by the infrastructure equipment to transmit a HARQ-ACK to the communications device in response to the uplink transmission.

9. The communications device according to claim 7, wherein the at least one parameter of the received uplink grant is a time delay between the transmission of the uplink grant by the infrastructure equipment and the transmission of the uplink transmission by the communications device.

10. The communications device according to claim 7, wherein the at least one parameter of the received uplink grant is a transport block size, TBS, scheduled by the uplink grant.

11. The communications device according to claim 7, wherein the at least one parameter of the received uplink grant is a granularity used by the communications device to monitor the wireless access interface for the uplink grant from the infrastructure equipment.

12. The communications device according to claim 1, wherein the controller circuitry is configured to control the transceiver circuitry
- to determine whether or not the communications device has received a second HARQ-ACK from the infrastructure equipment in response to the uplink transmission, and
- to monitor for the first HARQ-ACK in the specific time slot and in the specific frequency resource of the wireless access interface in accordance with the received e-HARQ indicator only if the communications device has not received the second HARQ-ACK.

13. The communications device according to claim 1, wherein the specific time slot in which the communications device should monitor for the first HARQ-ACK is predetermined and is known to the communications device.

14. The communications device according to claim 1, wherein the specific time slot in which the communications device should monitor for the first HARQ-ACK is indicated in an RRC configuration message received by the communications device from the infrastructure equipment.

15. The communications device according to claim 1, wherein the controller circuitry is configured to control the transceiver circuitry
- to receive, from the infrastructure equipment, an uplink grant indicating resources of the wireless access interface that the communications device should use for the uplink transmission to the infrastructure equipment,
- wherein the specific time slot in which the communications device should monitor for the first HARQ-ACK is indicated in the uplink grant.

16. The communications device according to claim 1, wherein the controller circuitry is configured to control the transceiver circuitry
- to determine the specific time slot in which the communications device should monitor for the first HARQ-ACK in accordance with a time delay between the transmission of the uplink grant by the infrastructure equipment and the transmission of the uplink transmission by the communications device.

17. The communications device according to claim 1, wherein the specific frequency resource in which the communications device should monitor for the first HARQ-ACK is indicated in an RRC configuration message received by the communications device from the infrastructure equipment.

18. A method of operating a communications device configured to receive data from an infrastructure equipment of a wireless communications network, the method comprising
- receiving an explicit uplink hybrid automatic repeat request acknowledgement indicator, e-HARQ indicator, from the infrastructure equipment, and
- determining, in accordance with the received e-HARQ indicator, whether or not the communications device should monitor for a first HARQ acknowledgement, HARQ-ACK, in a specific time slot and in a specific frequency resource of a wireless access interface provided by the wireless communications network, the first HARQ-ACK being transmitted by the infrastructure equipment in response to an uplink transmission from the communications device to the infrastructure equipment,
- wherein the specific time slot in which the communications device should monitor for the first HARQ-ACK is one of a plurality of consecutive time slots forming a time window, and the communications device is configured to monitor one or more of the plurality of consecutive time slots of the time window for the first HARQ-ACK.

19. Circuitry for a communications device configured to receive data from an infrastructure equipment of a wireless communications network, the communications device comprising transceiver circuitry configured to transmit signals and to receive signals via a wireless access interface provided by the wireless communications network, and controller circuitry configured to control the transceiver circuitry to receive explicit an uplink hybrid automatic repeat request acknowledgement indicator, e-HARQ indicator, from the infrastructure equipment, and to determine, in accordance with the received e-HARQ indicator, whether or not the communications device should monitor for a first HARQ acknowledgement, HARQ-ACK, in a specific time slot and in a specific frequency resource of the wireless access interface, the first HARQ-ACK being transmitted by the infrastructure equipment in response to an uplink transmission from the communications device to the infrastructure equipment, wherein the specific time slot in which the communications device should monitor for the first HARQ-ACK is one of a plurality of consecutive time slots forming a time window, and the communications device is configured to monitor one or more of the plurality of consecutive time slots of the time window for the first HARQ-ACK.

* * * * *